United States Patent [19]
Brossard

[11] Patent Number: 5,492,418
[45] Date of Patent: Feb. 20, 1996

[54] INTERMEDIATE BEARING FOR MULTI-COMPONENT DRIVELINES IN MOTOR VEHICLES

[75] Inventor: Jean-Claude Brossard, Meulan, France

[73] Assignee: GKN Automotive AG, Lohmar, Germany

[21] Appl. No.: 287,969

[22] Filed: Aug. 9, 1994

[30] Foreign Application Priority Data

Aug. 10, 1993 [FR] France .................... 93 09811

[51] Int. Cl.⁶ ........................................... F16C 27/06
[52] U.S. Cl. ................................................... 384/536
[58] Field of Search ........................ 384/536, 535, 384/582, 222

[56] References Cited

U.S. PATENT DOCUMENTS

| | | |
|---|---|---|
| 2,102,415 | 12/1937 | Herreshoff . |
| 2,439,267 | 4/1948 | Shafer . |
| 2,580,119 | 12/1951 | Meyers .................... 384/222 |
| 2,618,520 | 11/1952 | Anderson et al. . |
| 3,309,154 | 3/1967 | Stokely .................... 384/536 |
| 4,392,694 | 7/1983 | Reynolds .................... 384/536 |
| 4,542,996 | 9/1985 | Brissette et al. .................... 384/536 |
| 4,571,098 | 2/1986 | Rudnik .................... 384/474 |
| 4,960,334 | 10/1990 | Mazziotti .................... 384/536 X |
| 5,161,903 | 11/1992 | March .................... 384/536 |

FOREIGN PATENT DOCUMENTS

| | | |
|---|---|---|
| 3701886A2 | 8/1988 | Germany . |
| 2238823 | 6/1991 | United Kingdom . |

*Primary Examiner*—Thomas R. Hannon
*Attorney, Agent, or Firm*—Harness, Dickey & Pierce

[57] ABSTRACT

An intermediate bearing (8) for a multi-component propeller shaft of a motor vehicle has a housing (9) which serves to receive a resilient bearing member (22) which, in turn, accommodates a sealed rolling contact bearing (37). To hold the bearing member (22) in the housing (9), a carrier (41) is provided which includes retaining tabs (44) which serve to retain the carrier (41) in the housing (9). Furthermore, the carrier (41) includes securing tabs (45) which axially hold the bearing member (22). The carrier may be connected to the housing (9) by a bayonet fixing mechanism. Furthermore, for securing purposes, a plate metal tab (50) is provided which is secured to the housing (9) by beading. The intermediate bearing is easy to assemble and its bearing member is secured against axial displacement.

9 Claims, 6 Drawing Sheets

INTERMEDIATE BEARING FOR MULTI-COMPONENT DRIVELINES IN MOTOR VEHICLES

BACKGROUND OF THE INVENTION

The present invention relates to an intermediate bearing for multi-component drivelines. The invention includes joints and connecting shafts which are used in motor vehicles, especially commercial vehicles, with a housing which may be secured to the motor vehicle. The housing accommodates a bearing member which includes a resilient material with damping properties. The bearing member includes a sealed rolling contact bearing to support the driveline.

The bearing member is accommodated to be laterally movable in the housing. However, it was found that there is a need for lateral retaining means.

SUMMARY OF THE INVENTION

It is an object of the invention to provide an intermediate bearing in the case of which the bearing member can be laterally secured by simple means and which is easy to assemble.

In accordance with the invention, a housing is provided in the form of a U-shaped bent plate metal part whose two arms include outwardly angled fixing flanges. The U-shaped inner contour of the housing serves to accommodate the respective outer face of the bearing member. The bearing member, in the region of its base face, is laterally guided by a tab secured to the housing. At least one aperture is provided in the region of the arch-shaped wall of the housing. A carrier passes through the aperture and may be secured to the housing by means similar to bayonet fixing means and which laterally guides the bearing member. The carrier is non-rotatably held in its fitted position by the bearing member.

The advantage of this design is that the bearing member is retained in the housing and secured against lateral displacement by the carrier and tab. Such retaining means are easy to produce. The carrier is easily secured to the housing and assumes the lateral retaining function in the region of the arch-shaped wall. After the bearing member has been inserted in the housing, it is finally secured by the tab, with the tab being secured by being deformed at the flanges. The bent edges of the tab embrace the base of the bearing member.

To achieve the bayonet fixing means effect, it is proposed that the aperture include a central circular portion and, starting therefrom, two diametrically opposed, substantially rectangular aperture portions. The carrier constitutes a formed plate metal part which includes a base part, a collar and retaining tabs connected thereto. The tabs are offset in parallel to the base part and are adapted to the shape of the rectangular aperture portions. For securing purposes, the carrier includes securing tabs which start from its base part.

Furthermore, to protect the bearing from any penetrating dirt, it is proposed that two plate metal bearing cups are inserted into the bearing member. The bearing cups form a seat face for the outer ring of the rolling contact bearing and are provided with radially inwardly directed flange portions which extend at a parallel distance from the end faces of the outer ring and form a grease receiving chamber. The bearing member and the bearing cups form channels which are connected to the grease receiving chamber. The bearing member is provided with a radially extending lubricating channel which is open in the region of the outer face of the bearing member positioned so as to be opposed to the carrier. The carrier is associated with a lubricating nipple. The grease receiving chambers prevent any dirt and moisture from penetrating from the outside.

By providing a lubricating facility it is ensured that any dirt which has already penetrated is pressed out during re-lubrication. The bearing itself is lubricated and sealed for life. The bearing cups largely prevent any contact between the lubricant and the resilient material bearing member. In this way it is ensured that the lubricant cannot have a detrimental effect on the service life of the bearing member. This embodiment is highly advantageous in that, by providing a replaceable carrier, e.g. by separating the carrier from the housing, the carrier is able to meet the requirements of different design variants in that, on the one hand, it only has a retaining function for the bearing member whereas, on the other hand, it may also be complemented by a lubricating nipple.

To achieve a leakproof connection, the carrier includes an indentation, with the shank of the lubricating nipple extending into the indentation from the outside and a shoulder of the bearing member extending into the indentation from the inside.

The shank of the lubricating nipple and the shoulder of the bearing member sealingly nest against one another, with the lubricating channel extending through the shoulder.

To permit the carrier to be used both with and without a lubricating nipple, the shank of the lubricating nipple is screwed into a threaded bore of the base part of the carrier.

To make it completely impossible for the carrier, in its fitted condition, to rotate into a release condition, the bearing member is provided with projections which project from its outer face and which, in the fitted condition, project into the rectangular aperture portions of the aperture.

From the following detailed description taken in conjunction with the accompanying drawings and subjoined claims, other objects and advantages of the present invention will become apparent to those skilled in the art.

BRIEF DESCRIPTION OF THE DRAWINGS

Preferred embodiments of the invention are diagrammatically illustrated in the drawing wherein.

DETAILED DESCRIPTION OF THE PREFERRED EMBODIMENTS

Figure 1:
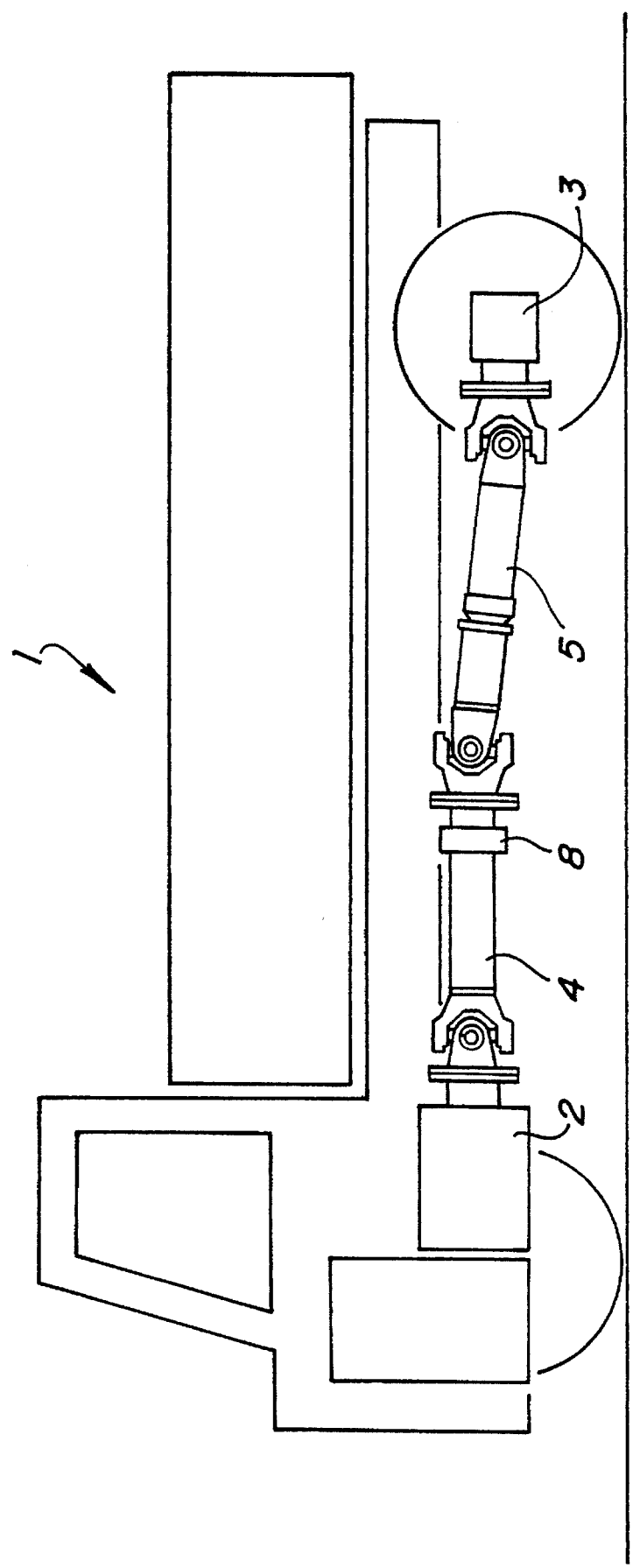
FIG. 1 is a diagrammatic view of a motor vehicle having a driveline driving its rear wheels.
Figure 2:
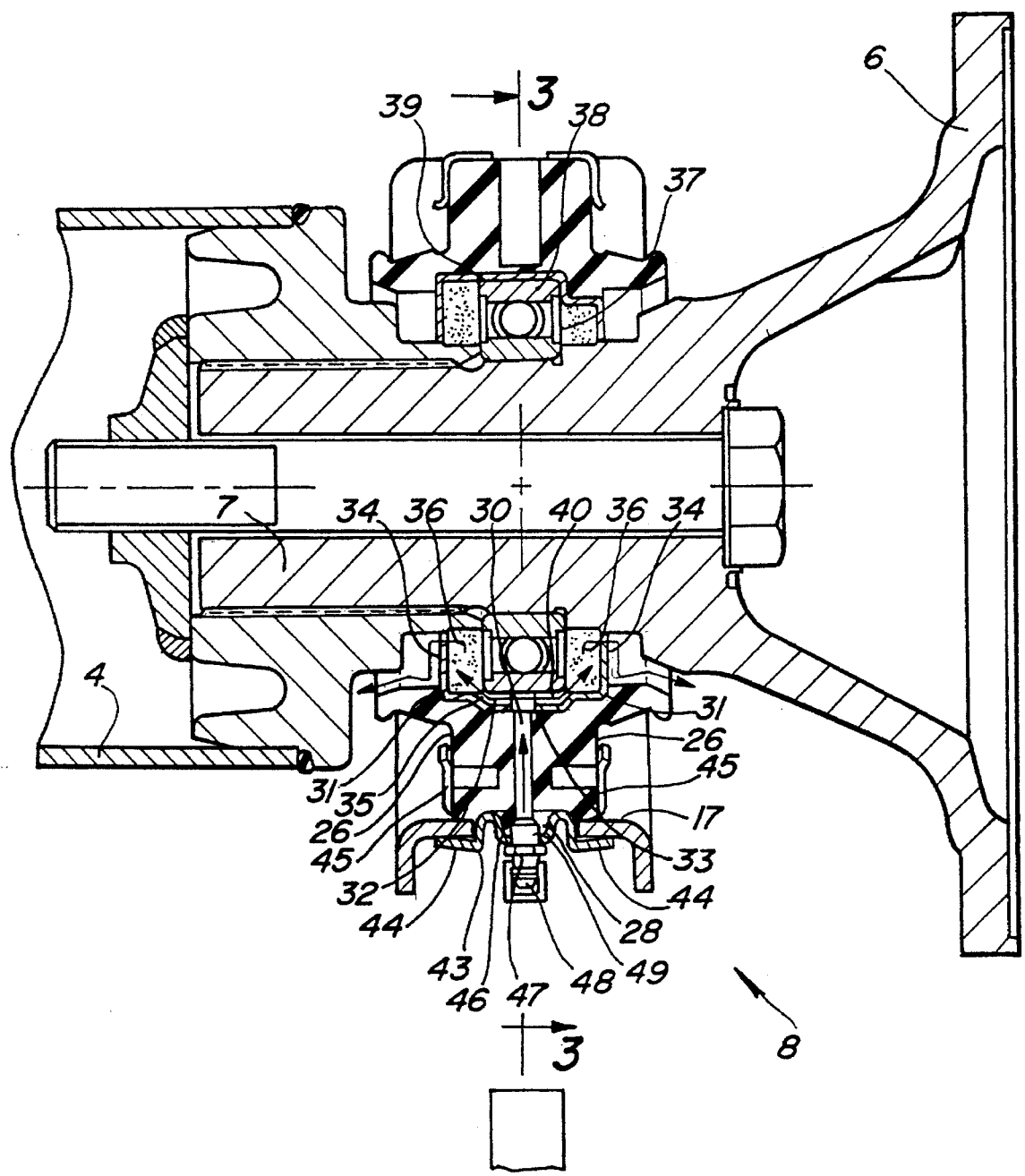
FIG. 2 is a cross sectional view of the detail X according to FIG. 1, of a first embodiment of an intermediate bearing in accordance with the present invention.
Figure 3:
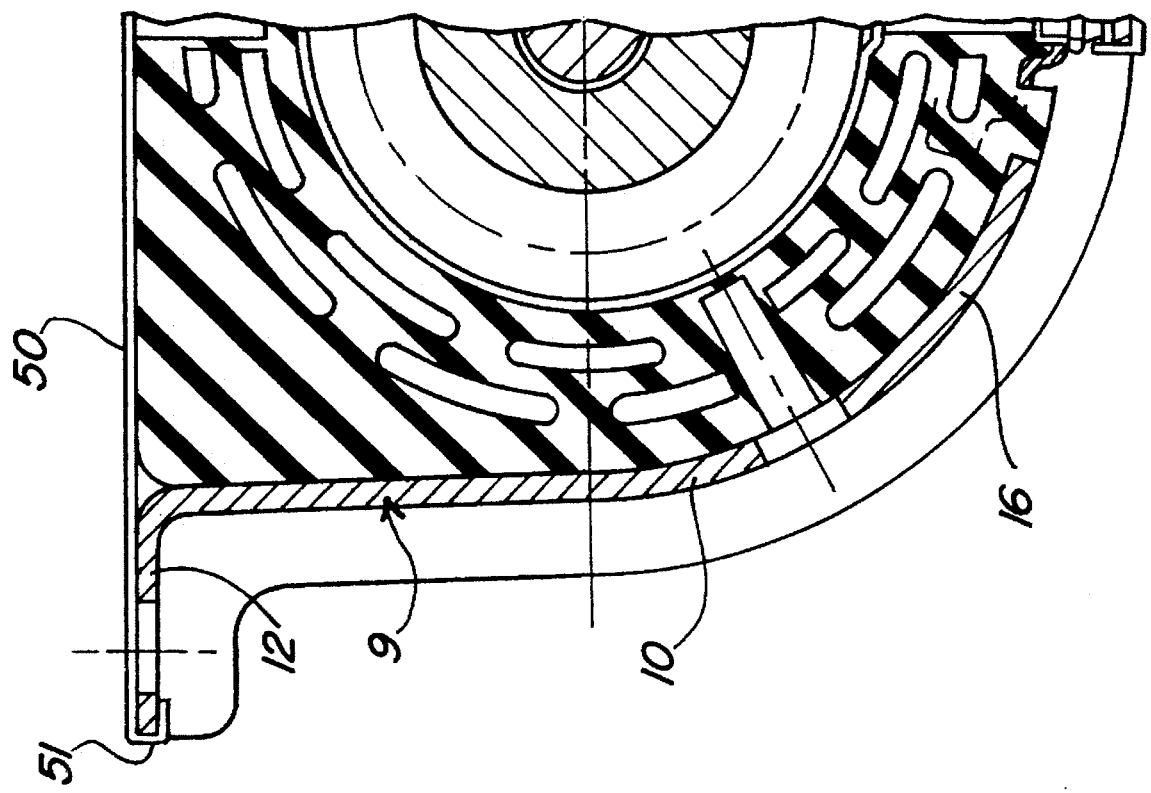
FIG. 3 is a cross-sectional view along line III—III of FIG. 2.

FIG. 1 shows a motor vehicle 1 where the rear wheels are driven by an engine with a gearbox 2. A driveline including a first driveline portion 4 and a second driveline portion 5 serves to transmit torque from the gearbox 2 to a differential 3 associated with the rear wheels. The two driveline portions 4, 5 are directly connected to one another with the first driveline portion 4, at its end pointing to the second driveline portion 5, additionally supported on the chassis of the vehicle 1 by an intermediate bearing 8. FIGS. 2 and 3 show the design of the bearing in the form of details, and FIGS. 4 to 8 illustrate the individual components of the bearing.

At the end of the first driveline portion 4 (as best seen in FIG. 2), a flange 6 carrying a flange journal 7 is connected by splines. The intermediate bearing 8 is held on the flange journal 7. The intermediate bearing 8 includes a housing 9 which is a formed plate metal part and which, in FIG. 4, is illustrated in greater detail in the form of an individual component. The housing 9 is substantially U-shaped and includes two arms 10, 11 connected to one another by an arch-shaped web 16, with fixing flanges 12, 13 bent outwardly from free ends of the two arms 10, 11. For reinforcing purposes, the housing 9 includes lateral reinforcing flanges 18. The two fixing flanges 12, 13 include bores 14, 15 which serve to secure the housing 9 and the intermediate bearing 8 to the vehicle.

The inner contour of the housing 9 is also U-shaped, with the bearing member 22 formed of a resilient material with damping properties and the bearing member 22 adapted to the inner contour. In the arch-shaped web 16, an aperture 19 is provided, with a carrier 41 passing therethrough. The carrier 41 may be secured in the aperture 19 by means similar to bayonet fixing means. The carrier 41 includes a base part 42, with double retaining tabs 44 bent therefrom and in consequence extending parallel to the base part 42. As a result of the bending operation, a collar 43 is formed which connects the base part 42 with the retaining tabs 44. Securing tabs 45 are bent from the base part 42.

The bearing member 22 is accommodated between the securing tabs 45 and retained laterally to prevent displacement. The outer face 23 of the bearing member 22 is substantially adapted to the inner contour 17. The bearing member 22 includes a planar base face 24. It also includes a central cylindrical bearing recess 25. A distributing recess 27 extends towards the axial ends of the bearing recess 25 and is formed into the bearing recess 25. A radially extending lubricating channel 30 opens towards the outer face 23 and runs into the distributing recess 27.

Two bearing cups 31 of identical shape are inserted into the bearing recess 25 and retained therein, with a gap existing between the two bearing cups. Furthermore, in the region of the distributing recess 27, the bearing cups 31 include an impression 35. The inner faces of the two bearing cups 31 serve as a seat face 32 for a rolling contact bearing 37. Furthermore the two bearing cups 31 include flange portions 34 which are arranged at a distance from the end faces 39 of the rolling contact bearing 37 and extend radially inwardly and whose inner diameters are guided close to the outer face of the flange journal 7 so that a small gap occurs.

The rolling contact bearing 37 is accommodated in the seat face 32 by means of its outer ring 38. Between the outer face of the outer ring 38 and the bearing cups 31, in the region of the impressions 35, a channel 40 is produced which is open towards the end faces 39 of the outer ring 38 and provides a connection with the grease receiving chamber 36 formed between the end faces of the rolling contact bearing 37 and the flange portions 34 of the bearing cups 31. The rolling contact bearing itself is sealed and lubricated for life. A lubricating channel 30 extends radially through the bearing member 22 towards the outer face and ends in the region of the carrier 41.

The carrier 41 includes an indentation 46 into which the bearing member 22 projects with its shoulder 28. The base part 42 includes a threaded bore 47, with the shank 49 of a lubricating nipple 48 screwed into the bore 47. The shank 49 projects inwardly into the indentation 46 and is sealingly pressed against the shoulder 28. Grease may be pressed into the channel 30 through the lubricating nipple 48 and reaches the grease receiving chambers 36 through the channel 30, the gap 33 and the channel 35. Once the grease receiving chambers 36 are full, the grease may move outward through the gap between the bore of the flange portion 33 and the outer faces of the flange journal 7 and of the connecting part of the first driveshaft portion 4, thereby generating a sealing effect to prevent any dirt or moisture from penetrating. Any dirt particles which succeeded in penetrating nevertheless may be conveyed outwardly by the lubrication process.

Figure 4B:
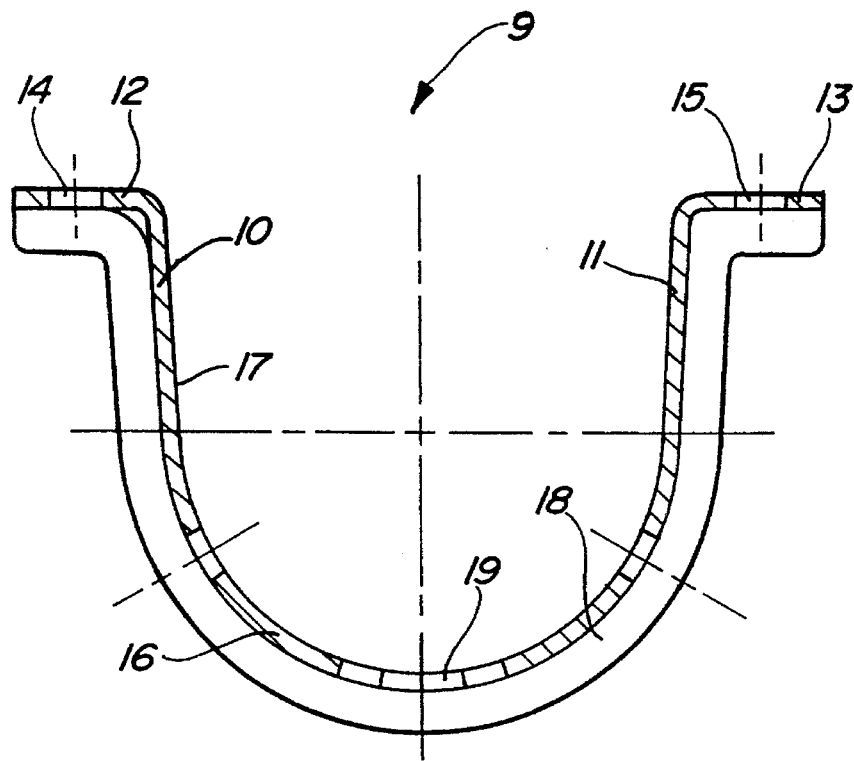
FIG. 4b is a cross sectional view of FIG. 4a along line 4b—4b thereof.
Figure 4C:
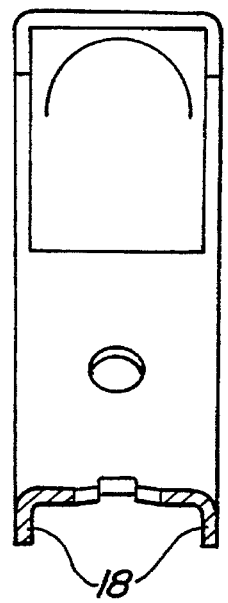
FIG. 4c is a cross sectional view of FIG. 4a along line 4c—4c thereof.
Figure 4A:
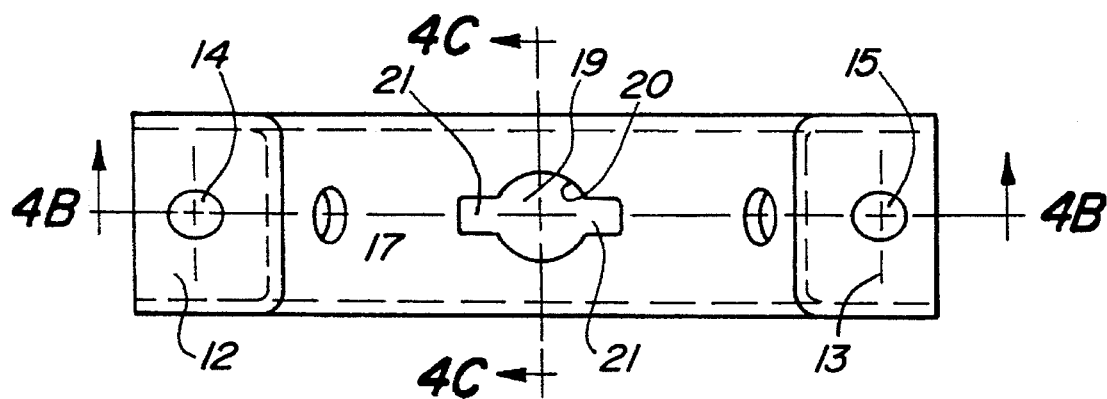
FIG. 4a is a plan view of a housing in accordance with the present invention.

FIGS. 4a through 4c show a design of the housing. It shows the two arms 10, 11 connected by the arch-shaped web 16, with the two fixing flanges 12, 13 angled outwardly from free ends of the arms 10, 11. The region of the fixing flanges 12, 13 of the arms 10, 11 and of the arch-shaped web 16 is reinforced by reinforcing flanges 18. The region of the arch-shaped web 16 includes aperture 19. The aperture 19 includes a central, substantially circular portion 20 and two diametrically opposed, substantially rectangular aperture portions 21. It can also be seen that the inner contour 17 of the housing 9 is substantially U-shaped and does not include any undercuts along the longitudinal axis.

Figure 5B:
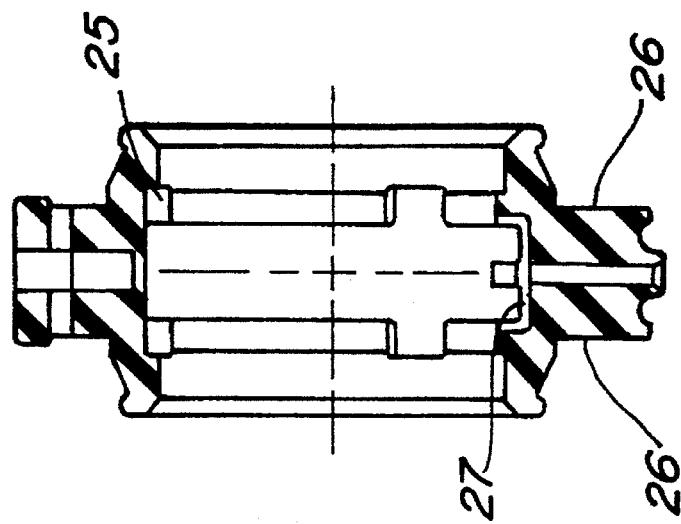
FIG. 5b is a sectional view of FIG. 5a through line 5b—5b thereof.
Figure 5A:
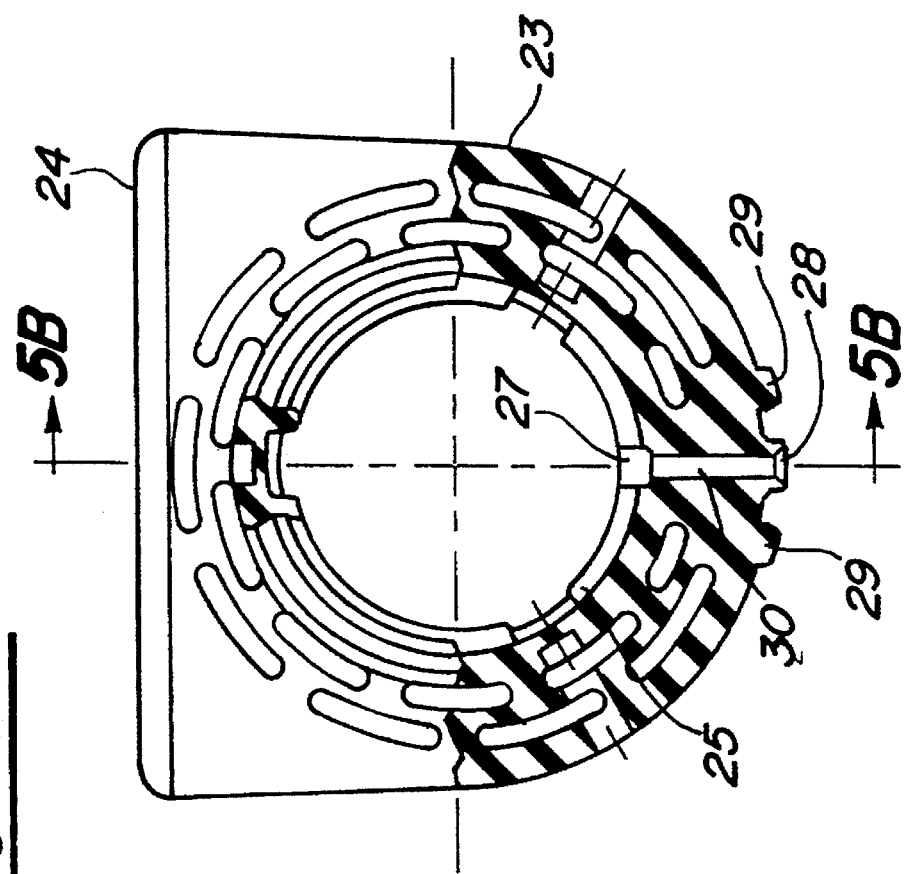
FIG. 5a is a plan view partially in section of a bearing member in accordance with the invention.

FIGS. 5a and 5b show the bearing member 22. The bearing member 22 includes an outer face 23, which is adapted to the housing inner contour 17, and a base face 24 which is received between the two connecting faces of the fixing flanges 12, 13 of the housing 9. The two side faces of the bearing member 22 have been given the reference number 26. They are received between the securing tabs 45 of the carrier 41. FIG. 5a also shows the shoulder 28 and the radially extending lubricating channel 30 which ends on the radial inside in the distributing recess 27. Furthermore, FIG. 5b illustrates the design of the bearing recess 25 with a side bead. It also shows two projections 29 which adjoin the shoulder 28. The projections 29 project beyond the outer face 23 and, in the fitted condition of the bearing member 22, they fill the two rectangular aperture portions 21 of the housing 9.

The two projections 29 prevent the carrier 41 from rotating in the fitted condition. Furthermore, as can be seen in FIG. 3, the bearing member 22 is retained in the housing 9 by a tab 50 which is a plate metal part and covers the base face 24 of the bearing member. The tab 50 also covers the connecting faces of the fixing flanges 12, 13 and is beaded at its ends. The beaded ends have been given the reference number 51 and extend between the two reinforcing flanges 18 in the region of the fixing flanges 12, 13, thereby preventing displacement of the tab 50. Furthermore, in the region of the bearing member 22, the tab 50 includes inwardly bent portions which embrace the side faces 26 of the bearing member 22.

Figure 6:
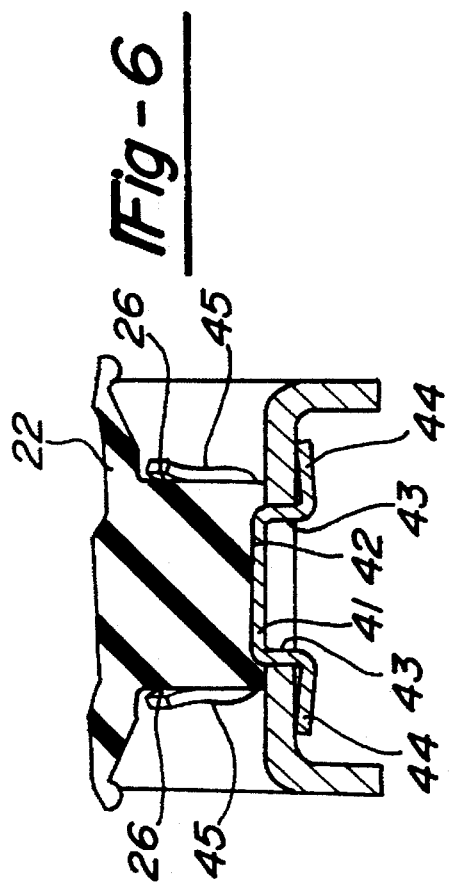
FIG. 6 is a detailed cross sectional view of an alternate embodiment of a carrier without a lubricating nipple.
Figure 8:
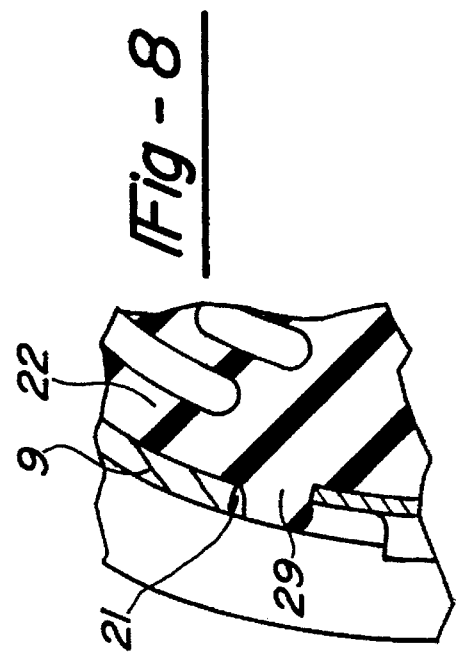
FIG. 8 is a section along line VIII—VIII according to FIG. 7.
Figure 7:
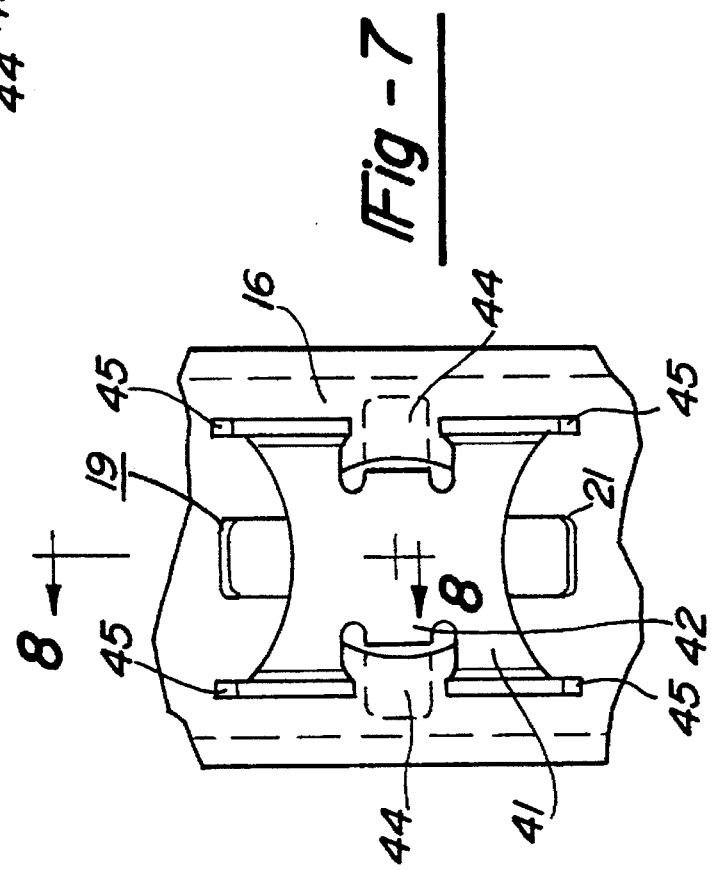
FIG. 7 is a plan view relative to the section according to FIG. 6.

FIGS. 6 and 7 show an alternative design of the carrier 41. In this case, the carrier 41 is not provided with a lubricating nipple. In consequence, the base part does not include an aperture and is smooth. Furthermore, the Figures show a collar 43 which extends radially outwardly from the base part 42 and which is followed by retaining tabs 44 produced by a further bending operation on opposed sides. The four securing tabs 45 are bent radially inwardly directly from the base part 42 and between them, accommodate the bearing member 22 with its side faces 26. The retaining tabs 44 are punched prior to being bent and prior to bending the securing tabs. The carrier is fitted in that it is first moved from the inside to the aperture 19 in the arch-shaped wall 16 of the housing 9, with the retaining tabs 44 overlapping with the aperture portions 21 of the aperture 19. After the retaining tabs 44 have been guided through the aperture portions 21, the carrier 41 is rotated by 90° so that the retaining tabs 44 assume the position indicated by dashed lines in FIG. 7. Subsequently, the bearing member 22 is slid in with its side faces 26 between the four securing tabs 45, and at the same time, towards the end of the assembly operation, the two projections 29 enter the aperture portions 21. Thus, projections 29 secure the carrier 41 and prevent it from rotating, which is illustrated in FIG. 8.

While the above detailed description describes the preferred embodiment of the present invention, the invention is susceptible to modification, variation, and alteration without deviating from the scope and fair meaning of the subjoined claims.

I claim:

1. An intermediate bearing for multi-component drivelines which include joints and connecting shafts and are used in motor vehicles, said bearing comprising:

a housing which may be secured to the motor vehicle;

a bearing member accommodated in said housing, said bearing member formed of a resilient material with damping properties and including a sealed rolling contact bearing adapted to support the driveline;

said housing further comprising a U-shaped plate metal part with arms connected by an arch-shaped web and outwardly angled fixing flanges extending from the arms, an inner contour of the U-shaped plate metal part serves to accommodate a respective outer face of the bearing member, said arch-shaped web including at least one aperture;

a tab secured to the housing laterally guides the bearing member in a region of a base face of the bearing member; and a carrier passes through said at least one aperture, said carrier laterally guides the bearing member, and said carrier is non-rotatably held in a fitted position by the bearing member.

2. An intermediate bearing according to claim 1, wherein said at least one aperture includes a central circular portion and, starting therefrom, two diametrically opposed, substantially rectangular aperture portions.

3. An intermediate bearing according to claim 2, wherein said carrier is a formed plate metal part including a base part, a collar and retaining tabs which are connected thereto, and which are offset in parallel to the base part and which are adapted to the shape of the rectangular aperture portions.

4. An intermediate bearing according to claim 3, wherein said carrier includes securing tabs which start from its base part and which laterally embrace the bearing member in the fitted condition.

5. An intermediate bearing according to claim 2, wherein the bearing member is provided with projections which project from its outer face and which, in the fitted condition, project into the rectangular aperture-portions of the at least one aperture.

6. An intermediate bearing according to claim 1, wherein two plate metal bearing cups are inserted into the bearing member, said bearing cups forming a seat face for an outer ring of the rolling contact bearing and being provided with radially inwardly directed flange portions which extend at a parallel distance from end faces of the outer ring and form a grease receiving chamber, said bearing member and bearing cups form channels which are connected to the grease receiving chamber, said bearing member is provided with a radially extending lubricating channel which is open in the region of the outer face of the bearing member positioned so as to be opposed to the carrier, and said carrier is associated with a lubricating nipple.

7. An intermediate bearing according to claim 6, wherein said carrier includes an indentation, a shank of the lubricating nipple extending into said indentation from the outside and a shoulder of the bearing member extending into said indentation from the inside.

8. An intermediate bearing according to claim 7, wherein the shank of the lubricating nipple and the shoulder of the bearing member sealingly rest against one another, with the lubricating channel extending through said shoulder.

9. An intermediate bearing according to claim 7, wherein the shank of the lubricating nipple is screwed into a threaded bore of the base part of the carrier.

\* \* \* \* \*